No. 763,954.

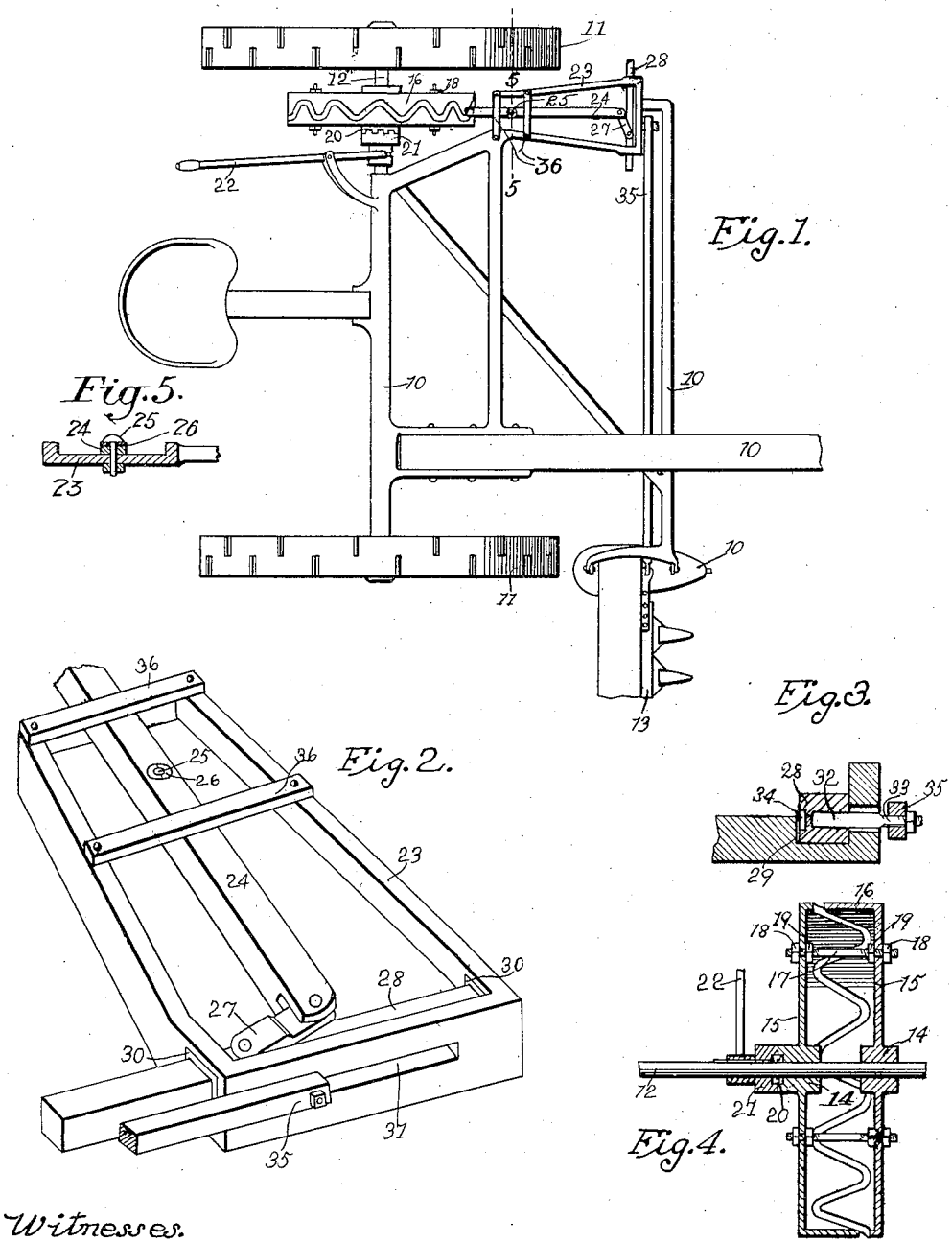

Patented July 5, 1904.

UNITED STATES PATENT OFFICE.

ABRAHAM L. BRANDT, OF HOMESTEAD, IOWA.

PITMAN FOR MOWING-MACHINES.

SPECIFICATION forming part of Letters Patent No. 763,954, dated July 5, 1904.

Application filed June 1, 1903. Serial No. 159,431. (No model.)

*To all whom it may concern:*

Be it known that I, ABRAHAM L. BRANDT, a citizen of the United States, residing at Homestead, in the county of Iowa and State of Iowa, have invented certain new and useful Improvements in Pitmen for Mowing-Machines, of which the following is a specification.

The objects of my invention are to provide an improved means of simple, durable, and inexpensive construction whereby power is applied from the traction-wheels of a mowing-machine to actuate the reciprocating knife-bar, said means having a minimum of friction and requiring a comparatively small amount of power to actuate the knife-bar.

My invention consists in certain details in the construction, arrangement, and combination of the various parts of the device whereby the objects contemplated are attained, as hereinafter more fully set forth, pointed out in my claim, and illustrated in the accompanying drawings, in which—

Figure 1 shows a top or plan view of the mowing-machine with my improvements applied thereto. Fig. 2 shows an enlarged detail perspective view of the means for transmitting motion from the grooved wheel to the pitman-rod. Fig. 3 shows an enlarged detail sectional view illustrating the means for connecting the pitman-rod with the slide-bar, and Fig. 4 shows an enlarged detail sectional view through the machine-axle and the grooved wheel thereon. Fig. 5 shows a transverse sectional view on the indicated line 5 5 of Fig. 1.

Referring to the accompanying drawings, I have used the reference-numeral 10 to indicate the machine-frame of ordinary construction. The numeral 11 indicates the traction-wheels fixed to the axle 12, and the reference-numeral 13 indicates the knife-bar, all of said parts being of the ordinary construction.

The means for reciprocating the knife-bar comprises, first, a grooved wheel on the axle. This grooved wheel is made of two parts, each part comprising a hub 14, and a disk 15, formed integral with the hub and having a laterally-projecting flange 16, the edge of said flange being provided with a cam-face, hereinafter more fully described. The two flanges are set in such position that the projections on one enter the depressions on the other to thereby form a continuous groove throughout the entire periphery of the wheel thus formed, said groove extending from a point near one disk 15 to a point near the adjacent disk and then back again throughout the entire periphery of the wheel. These disks 15 are spaced apart and held at the desired position by means of a series of screw-threaded bolts 17, passed transversely through both disks 15 and provided with nuts 18 on the outside of the disks and nuts 19 on the inside thereof, so that by adjusting these nuts the disks may be firmly secured at any desirable position relative to each other. As will hereinafter appear, the cam-faces of the adjacent flanges are subject to wear, and by providing means by which they may be adjusted relative to each other the wear which takes place may be compensated for by adjusting the nuts as required to bring the disks closer together. Both of the hubs 14 are loosely mounted upon the axle 12, and I have provided means whereby the grooved wheel may be made to rotate in unison with the axle 12, as follows: The face of one of the hubs 14 is provided with a clutch member 20, and a mating clutch member 21 is feathered to the shaft 12 and controlled by a lever 22, and obviously by a manipulation of the lever 22 the clutch member 21 may be thrown into engagement with the clutch member on the hub, and the grooved wheel will then be rotated in unison with the axle 12, and when the movable clutch member is thrown to its opposite limit the axle may rotate without turning the grooved wheel. The reference-numeral 23 indicates a frame formed on or fixed to the machine-frame 10. This frame 23 supports a lever 24, one end of which enters the groove of the grooved wheel. The said lever is mounted upon the pin 25, and surrounding this pin 25 are the bearings 26, thus forming a fulcrum for the lever 24 and by means of the bearings reducing the friction on the pin 25 to a minimum. The other end of the lever 24 is slotted, and an arm 27 is pivoted therein and also pivoted to a slide-bar 28, which slide-bar is angular in cross-section and is mounted in a groove 29 in the frame 23 and extends through openings in the sides of the frame 23. This slide-bar 28 is provided with angular bearings 30 in the sides of the frame 23 to thereby minimize friction between the slide-bar and the frame and prevent all movements of the slide-bar except in a longitudinal direction. In the outer end of the frame 23 I have provided a slot 31, and in the slide-bar 28 I have placed an angular journal 32, projecting through the slot 31 and having a rounded outer end 33 for purposes hereinafter made clear. The inner end of the journal 32 is screw-threaded and provided with a nut 34, said nut being embedded in the inner face of the slide-bar, thus securely holding the angular journal to the slide-bar. This journal is connected to the slide-bar at a point near its longitudinal center and between the points where the arm 27 is pivoted to the slide-bar and the bearing for the outer end of the slide-bar. In this connection it is to be remembered that the pitman 35 is mounted on the outer end of the journal 33, and the said pitman is connected with the knife-bar, which knife-bar is sometimes raised and lowered relative to the machine-frame. Hence the thrust of the pitman-rod 35 is not always in a direction parallel with the slide-bar, and by attaching the pitman-journal to the slide-bar at the point indicated I prevent this irregular movement of the pitman-rod from causing the slide-bar 28 to bind upon its bearings, as would be the case if the pitman were attached direct to one end or the other of the slide-bar. The reference-numeral 36 indicates cross-pieces fixed to the sides of the frame 23 and overlapping the lever 24 on opposite sides of its fulcrum. These cross-pieces prevent the lever 24 from moving upwardly, as it would have a tendency to move when the machine is backed.

In practical operation and assuming the device to be applied to a mower, as shown, and assuming, further, that the clutch device is out of engagement, the machine may be advanced over the ground without turning the grooved wheel and without moving the knife-bar. Then when it is desired to operate the knife-bar the driver manipulates the lever 22 as required to throw the clutch device in gear, whereupon the grooved wheel is rotated. This rotation of the grooved wheel obviously will cause the lever 24 to reciprocate, as one end of said lever rests in the groove and is moved from one side to the other of the periphery of the grooved wheel to conform to the curvature of the said groove. The slide-bar 28 is reciprocated in a straight line by the arm 27, and the pitman-rod being attached to the slide-bar at the point shown and described drives the knife-bar in such a manner that there is no twisting strains applied to the slide-bar 28. If after considerable wear there is lost motion between the end of the lever 24 and the grooved wheel, the parts of the wheel are moved toward each other by a manipulation of the nuts 18 and 19.

Having thus described my invention, what I claim, and desire to secure by Letters Patent of the United States therefor, is—

A frame having a slot near its forward end and also having bearings in the side of its forward end, a slide-bar mounted in said bearings, a lever fulcrumed to the frame, means for oscillating the lever, an arm pivoted to the lever and to the slide-bar, a journal fixed to the said slide-bar at a point between the arm and the outer bearing of the slide-bar and moving in said slot, and a pitman pivoted to the journal.

ABRAHAM L. BRANDT.

Witnesses:
ROBERT R. DENSON,
CHAS. C. M. WESSLOW.